Nov. 23, 1965     P. R. ROWLEY     3,218,659

FLOW LINE PIG INJECTOR

Filed March 26, 1963     3 Sheets-Sheet 3

INVENTOR.
PAUL R. ROWLEY
BY Donald W Canady
ATTORNEY

United States Patent Office 3,218,659
Patented Nov. 23, 1965

3,218,659
FLOW LINE PIG INJECTOR
Paul R. Rowley, Long Beach, Calif., assignor to Richfield Oil Corporation, Los Angeles, Calif., a corporation of Delaware
Filed Mar. 26, 1963, Ser. No. 268,189
4 Claims. (Cl. 15—104.06)

My present invention relates to means for cleaning flow lines and, more particularly, relates to means for injecting cleaning plugs periodically into a flow line to remove accumulations of material which tend to restrict the flow through the flow line.

The accumulation of waxes, asphaltines, and scale in flow lines tends to restrict flow through such lines. Various chemical, mechanical and heating methods have been proposed for removing deposits from the internal surfaces of flow lines, tubing pipes and the like. This invention relates generally to the mechanical method for removing such deposits with a cleaning plug or "pig" which is inserted into a flow line, pipe line, or the like and forced through the line by the pressure of the fluid flowing therethrough to thereby clear the pipe of the aforementioned restrictions. This invention is more specifically concerned with providing a device for inserting a pig into a flow line at or near the well head of an underwater oil well without interrupting flow of the well. The embodiment of my present invention described herein relates to offshore operations, however, my present invention may also be utilized in onshore operations.

The pig utilized in my present invention may be any resilient material which is resistant to swelling upon contact with well fluids or moisture and may also be of the type which is soluble in the well fluids. The shape of the pig should conform to the cross sectional configuration of the flow line to be cleaned and preferably is either spherical or cylindrical.

Pigs have been injected into flow lines in a variety of ways including manual insertion of the pig between manually operated valves. Manual injection in conjunction with offshore operations is impractical, particularly when the wells are widely scattered. Automatic insertion between valves actuated by external energy forces, according to onshore techniques, have heretofore been found unfeasible for underwater operations.

It is, therefore, an object of my present invention to provide a means for remotely injecting a pig into a flow line without interrupting well flow.

It is also an object of my present invention to provide a means for automatically injecting a pig into a flow line with energy supplied from an onshore installation.

It is also an object of my present invention to provide an apparatus for injecting a pig into a flow line without utilizing bypass or diverting valves or lines.

Other objects and a more complete understanding of my present invention may be had by reference to the following specification and the appended claims when taken in conjunction with the accompanying drawings, wherein:

Figure 1:
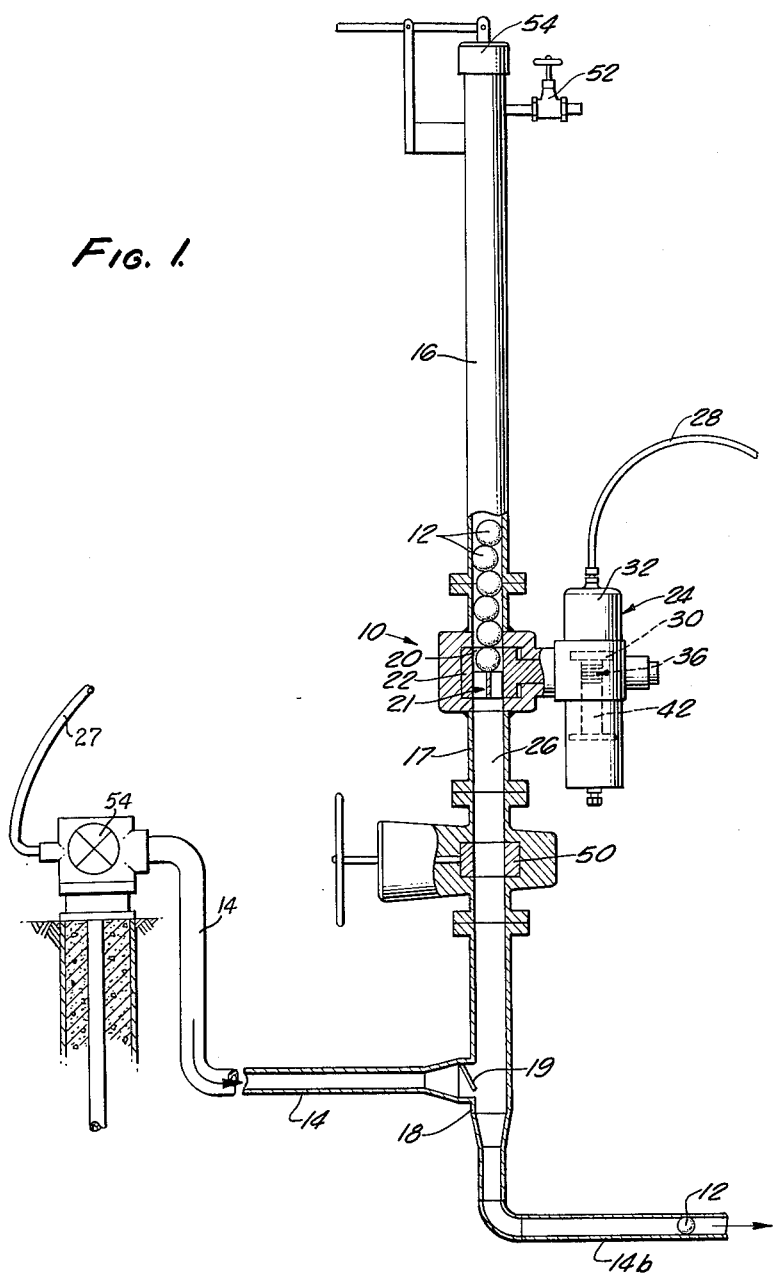
FIG. 1 is an elevation partially in section: showing the manner in which the device of my present invention injects pigs into a flow line.

With reference to the drawings generally, the device of my present invention shown in FIG. 1 provides a remotely controlled pig launcher 10 for injecting pipe line cleaning plugs or "pigs" 12 into a flow line 14 from an attached magazine 16 without interrupting the flow through the flow line 14–14b. The pig launcher utilizes a rotatable valve member 22 which may be remotely rotated through hydraulic control line 28 to drop a pig 12 into the flow line 14b.

Referring now more particularly to FIG. 1, a pig launcher or injector assembly 10 is installed on a flow line 14 downstream from a well head (not shown). The production from the well head flows from the well head through flow line 14 into a T section 18 through which a pig 12 may be inserted by the injector mechanism into the flow line and the production flow forces the pig 14 on through the flow line 14b. Pigs are stored in a tubular magazine chamber 16, as shown in the cutaway portion of magazine 16 in FIG. 1, and fall one at a time into the upper section 20 or onto pig seat 21 of the launch valve 22.

Figure 2:
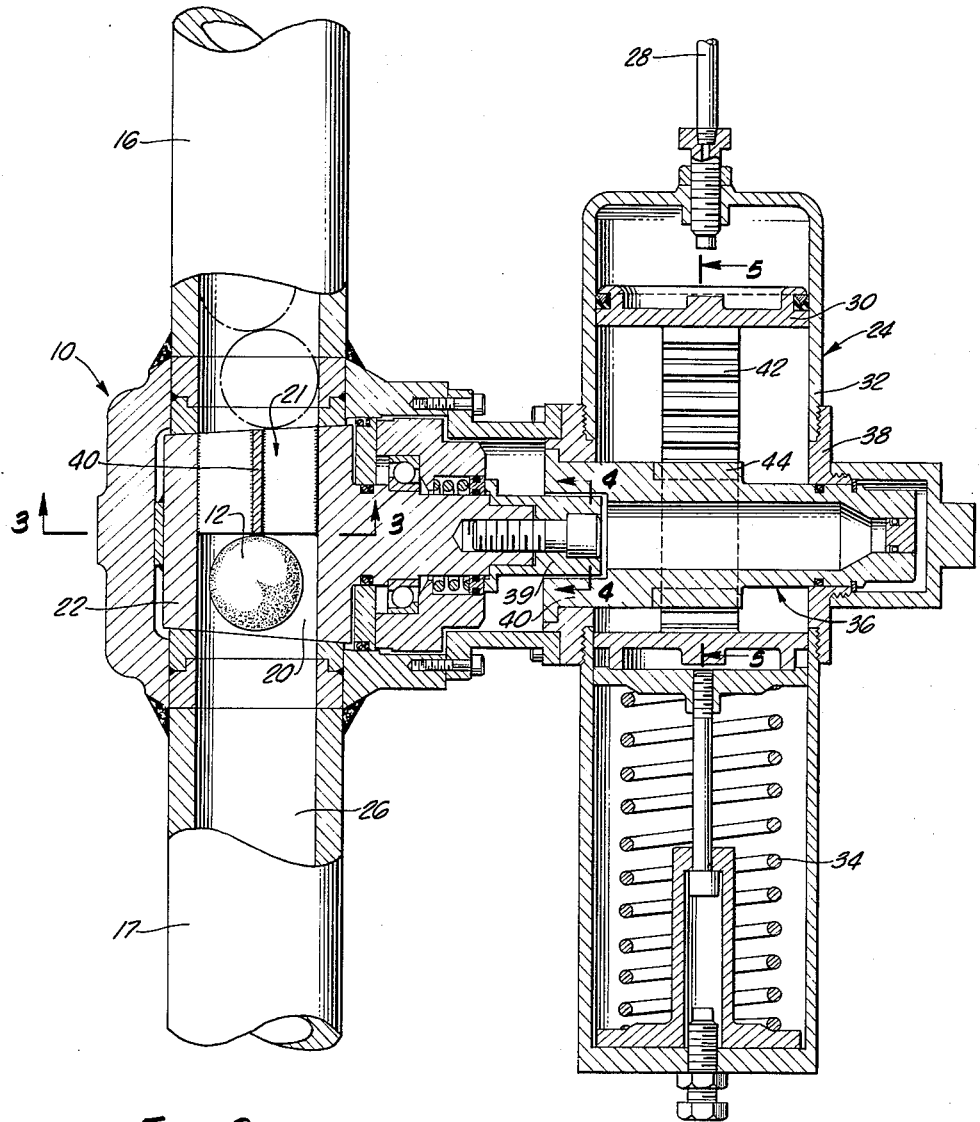
FIG. 2 shows an enlarged view of the pig launching mechanism.

Launch valve 22 is of the plug valve type and may be a tapered barrel valve, as shown, having a seat 21 and open housing area 20 for a single pig. As shown in FIGS. 1 and 2, the seat 21 of the launch valve is adapted to register with the bore of the magazine 16 to receive a single pig therefrom. When the valve 22 is rotated 180° by the actuator device 24 shown in FIG. 2, the pig contained in the pig seat 21 drops through the bore 26 below the launch valve and into the flow line 14b vertically through the run of T section 18. Certain modifications may be made in the chamber and valve rotating mechanism design without departing from the scope of the present invention. For example, the magazine or tubular chamber 17 below the launch valve housing may be inclined, thereby landing a pig by rotation of the valve rotation of just more than 90° will be sufficient inclination of the bottom chamber 17 may be such that valve rotation of just more than 92° will be sufficient to drop a pig into the flow line.

The value 22 may be rotated 108° by actuator mechanism 24, as shown in detail in FIG. 2, and is designed to return to the position shown in FIG. 1 when the pig has been dropped into the flow line 14b. The device used for rotating the launch valve 22 may be a spring loaded hydraulic actuator device, as shown in FIG. 2, which may be controlled from shore through a hydraulic line 28. In the device shown in FIG. 2, hydraulic fluid applied through line 28 moves the piston 30 downward in cylinder 32 against spring 34. Pinion gear 36 is housed within body member 38 and is rotatable therein. When the pinion 36 is rotated, the plug 22 is rotated through plug stem 39 and a stem adapter 40 on the pinion gear which is rotated when the gear rack 42 is driven downward with piston 30 through engagement of the teeth on the gear rack 42 with the pinion gear teeth 44.

Hydraulic pressure is normally maintained on the piston 30 so that the piston is held in the lower portion of the cylinder 32 in which position the open end 20 of the plug valve 22 is rotated to face upward. When the hydraulic pressure on the piston 30 is released through line 28, the spring 34 moves the piston 30 upward in the cylinder 32 and the gear rack 42, which is affixed to piston 30, moves upward and thus rotates the pinion 36 by engagement of the gear rach teeth 42 with the pinion gear teeth 44. Plub 22, with a pig 12 in its open end 20, is thereby rotated 180° whereby the open end 20 of the valve 22 faces downwardly, in which position the pig 12 drops through the bore 26 of chamber 17 and T section 18 into the flow line 14b. The reapplication of hydraulic pressure through line 28 drives the piston 30 and the gear rack 42 downwardly so that the plug 22 is rotated 180° and thereby faces the open end 20 upward to receive another pig.

Figure 3:
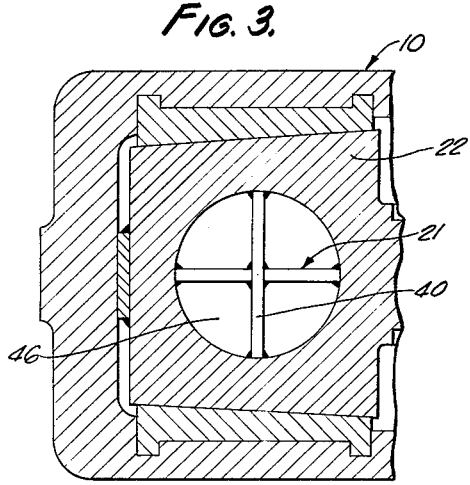
FIG. 3 is a sectional view taken on line 3—3 of FIG. 2 showing the pig seat in the launch valve.
Figure 4:
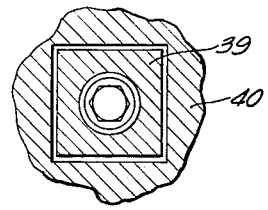
FIG. 4 is a sectional view taken on line 4—4 of FIG. 2 pinion-valve coupler.
Figure 5:
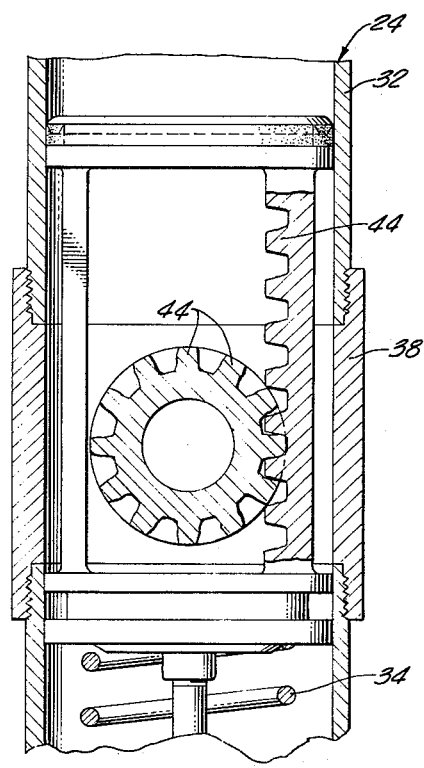
FIG. 5 is a sectional view taken on 5—5 showing the gear rack and pinion drive.
Figure 6:
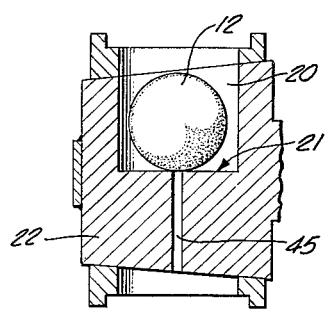
FIG. 6 is a sectional view of a modified plug valve useful with my present invention.

In a modification of my present invention, the hydraulic control line 27 used to operate the well head control valve 54 may be used to operate the pig injector 10, thus saving the cost of a separate hydraulic control system for a hydraulically operated pig injector. In this modification, bleeding the hydraulic pressure exerted through the control lines 27 and 28, rotates valves 22 to launch a pig into the flow line 14b and also closes the well head valves to momentarily stop flow through flow line 14. Because of the momentary pressure drop in the flow line when a pig is launched according to said modification, it is desirable to provide for pressure equalization across valve 22 in order to conserve on the launch valve device equipment costs. This may be accomplished by any convenient means which will result in pressure communication through the valve, as, for example, by drilling a small hole through the central bore of the valve, as shown in FIG. 6, or by forming the pig seat of valve member 22 with four parted quarter sections 46, as shown in FIG. 3, whereby the parting between the quarter members 46 defines fluid passageways 40 through which fluids can pass.

When it is desired to reload the magazine 16 with additional pigs, shutoff valve 50, which may be a conventional manually or hydraulically operated plug valve, is closed and pressure in the magazine relieved through a bleedoff valve 52. The cap 54 is then removed and additional pigs inserted into the magazine 16 after which the cap 54 is replaced, bleedoff valve 52 closed, and the shutoff valve 50 reopened.

Thus, with the pig launcher of my present invention a pig may be injected into a flow line by merely releasing hydraulic pressure from a shore installation through hydraulic control line 28. Releasing the hydraulic pressure, as previously stated, causes the plug 22 to be rotated at 180° to thereby drop a pig 12 through the bore 26 and the T section 18 into the flow line 14b where it can be driven through the flow line to effect cleaning thereof by the fluid pressure in the flow line.

Although I have described my present invention with a certain degree of particularly, it is to be understood that the scope of my invention is not to be limited by the details set forth, but should be afforded the full breadth of the appended claims.

I claim:

1. An apparatus for injecting a cleaning pig into a flow line arranged to receive flow from an underwater well through a well head having a hydraulically controlled shut-off valve thereon arranged to shut off flow from said well into said flow line by remote control, comprising in combination:
    a pig storage chamber,
    said chamber being vertically inclined to said flow line,
    a conduit providing communication between said chamber and said flow line,
    launch valve means traversing said conduit and having a recessed seat therein for receiving a pig from said chamber,
    said valve means being rotatable with respect to said conduit whereby said pig in said valve seat may be dropped through said conduit past said valve means and into said flow line upon rotation of said launch valve means,
    launch valve rotating means adapted for conjoint operation with said shut-off valve, said valve rotating means being arranged to rotate said launch valve to drop a pig into said flow line when said well-head valve is actuated to prevent flow from said well to said flow line whereby said pig enters said flow line during said flow interruption,
    said valve rotating means including a hydraulically actuatable piston gear rack and a pinion gear,
    said gear rack being adapted to drive said pinion gear rotatably,
    said pinion gear being coupled to said launch valve means and arranged to retain said pig in said seat when the pressure on said shut-off valve hydraulic control fluid is maintained on said piston gear rack,
    and spring means for moving said piston rack to rotate said launch valve means and thereby drop said pig through said conduit into said flow line when the pressure on said shut-off control fluid is released.

2. An apparatus for injecting a cleaning pig into a flow line arranged to receive flow from an underwater well through a well head, said well head having a hydraulically controlled shut-off valve thereon arranged to shut off the flow from said well into said flow line, comprising in combination:
    a pig storage chamber,
    said chamber being vertically inclined to said flow line,
    a conduit providing communication between said chamber and said flow line, said flow line joining said conduit at a T-section so arranged that said conduit is axially aligned with the run of said T,
    launch valve means traversing said conduit and having a seat therein for receiving a pig from said chamber,
    said valve means being rotatable with respect to said conduit whereby a pig in said seat may be dropped through said conduit past said launch valve means into said flow line through the run of said T upon rotation of said launch valve means,
    launch valve rotating means adapted for conjoint operation with said shut-off valve,
    said valve rotating means being arranged to rotate said launch valve to drop the pig into said flow line when said well head valve is actuated to prevent flow from said well to said flow line whereby said pig enters said flow line during said flow interruption,
    said launch valve rotating means including a hydraulically actuated piston gear rack and pinion gear,
    said gear rack being adapted to drive said pinion gear rotatably,
    said pinion gear being operatively coupled to said launch valve means,
    and means hydraulically coupled to said shut-off valve control means for actuating said gear rack when said shut-off valve is closed to thereby drop a pig into said flow line when said shut-off valve is actuated to prevent flow from said well into said flow line.

3. An apparatus for injecting a cleaning pig into a flow line arranged to receive flow from a well through a well head having a controlled shut-off valve for preventing fluid flow between said well and said flow line, comprising in combination:
    a pig storage chamber arranged and constructed to supply a pig to said flow line,
    means including a pig injector valve for providing communication between said chamber and said flow line,
    said pig injector valve being arranged and constructed to drop a pig from said storage chamber into said flow line when said injector valve is actuated,
    means controlled conjointly with said shut-off valve for actuating said injector valve to drop a pig into said flow line when said shut-off valve is actuated to prevent said flow between said well and said flow line.

4. An apparatus for injecting a cleaning pig into a flow line arranged to receive flow from a well through a well head having a fluid control shut-off valve for preventing flow from said well through said flow line, comprising in combination:

a pig storage chamber,
said chamber being vertically inclined to said flow line,
a conduit providing communication between said chamber and said flow line,
pig injector valve means traversing said conduit,
said pig injector valve means having a seat therein for receiving a pig from said chamber,
said pig injector valve means being rotatable and so arranged and constructed that said pig in said valve seat may be dropped through said conduit past said pig injector valve means into said flow line upon rotation of said pig injector valve means,
and means controlled conjointly with said shut-off valve for rotating said pig injector valve to drop the pig into said flow line when said shut-off valve is actuated to prevent said flow between said well and said flow line.

References Cited by the Examiner

UNITED STATES PATENTS

| | | | |
|---|---|---|---|
| 2,669,936 | 2/1954 | Elkins et al. | 15—104.06 X |
| 2,790,500 | 4/1957 | Jones | 15—104.06 |
| 2,818,592 | 1/1958 | Scaramucci | 15—104.06 |
| 2,854,990 | 10/1958 | Granberg | 251—250 |
| 2,915,422 | 12/1959 | Stone | 15—104.06 X |
| 2,963,260 | 12/1960 | Siravo | 251—250 |
| 3,000,028 | 9/1961 | Buie et al. | 15—104.06 |
| 3,039,531 | 6/1962 | Scott | 166—70 |
| 3,125,116 | 3/1964 | Schaberg | 15—104.06 X |

CHARLES A. WILLMUTH, *Primary Examiner.*

UNITED STATES PATENT OFFICE
CERTIFICATE OF CORRECTION

Patent No. 3,218,659                      November 23, 1965

Paul R. Rowley

It is hereby certified that error appears in the above numbered patent requiring correction and that the said Letters Patent should read as corrected below.

Column 2, line 39, strike out "rotation of just more than 90° will be sufficient" and insert instead -- 22 less than 180°. It is thus apparent that the --; line 41, for "92°" read -- 90° --; line 43, for "108°" read -- 180° --; line 69, for "Plub" read -- Plug --.

Signed and sealed this 1st day of August 1967.

(SEAL)
Attest:

Edward M. Fletcher, Jr.                        EDWARD J. BRENNER
Attesting Officer                               Commissioner of Patents